April 30, 1968 W. J. MILLON 3,381,141

AMPLITUDE DETECTOR EMPLOYING SPECIALLY BIASED TRANSISTORIZED SCHMITT TRIGGER IN COMBINATION WITH TRANSISTORIZED INPUT AMPLIFIER FOR TEMPERATURE COMPENSATION

Filed July 6, 1964

Inventor
William J. Millon
By Mueller & Aichele
Attys.

United States Patent Office 3,381,141
Patented Apr. 30, 1968

3,381,141

AMPLITUDE DETECTOR EMPLOYING SPECIALLY BIASED TRANSISTORIZED SCHMITT TRIGGER IN COMBINATION WITH TRANSISTORIZED INPUT AMPLIFIER FOR TEMPERATURE COMPENSATION

William J. Millon, Chicago, Ill., assignor to Motorola, Inc., Franklin Park, Ill., a corporation of Illinois Filed July 6, 1964, Ser. No. 380,339
3 Claims. (Cl. 307—235)

ABSTRACT OF THE DISCLOSURE

Temperature compensation is provided for a combination amplifier Schmitt trigger circuit by the use of transistors having substantially the same temperature characteristics in each circuit. Each circuit is uncompensated for temperature and the Schmitt trigger is designed to have its sensitivity change with temperature in a direction opposite to the change in gain of the amplifier with temperature. This provides temperature compensation for the combination without the need for special components or special temperature compensating circuits for each separate circuit.

In many electronic applications it is desirable to develop an output signal when an alternating current signal reaches a predetermined magnitude. In order that this may be done accurately it is necessary that the circuits used be temperature compensated so that the level of the alternating current signal at which the output signal is developed is relatively independent of the ambient temperature of the circuit. This is particularly true in transistor circuits, as transistors have parameters which undergo large changes with changes in temperature. The required temperature compensation has been accomplished by the use of feedback and by the use of special components having temperature characteristics which offset the effect of the changes in the transistor parameters. The use of components with special temperature characteristics increases the cost of the circuits. Further, feedback reduces the gain of the circuits and additional circuitry may be required to provide sufficient gain.

It is therefore an object of this invention to provide a signal detection circuit with improved means of temperature compensation.

Another object of this invention is to provide a signal detection circuit in which temperature compensation is provided without the use of special components.

A feature of this invention is the provision of a signal detection circuit in which the temperature characterstics of the amplifying stages are opposite to those of the output signal producing stages and of the same magnitude.

Another feature of this invention is the provision of a signal detection circuit using transistors having substantially the same temperature characteristics in the amplifier and Schmitt trigger circuits whereby the increase in gain of the amplifier circuit with increase in temperature is offset by the decrease in sensitivity of the Schmitt trigger circuit with increase in temperature.

This invention is illustrated in the drawings wherein.

In practicing this invention an alternating current signal level detection circuit is provided consisting of an alternatng current amplifier, a detector and a Schmitt trigger circuit. When the detected output of the amplifier reaches a predetermined level, the Schmitt trigger is energized producing an output pulse. The alternating current amplifier is a transistor amplifier having no feedback or temperature compensating components and thus its gain changes with changes in the ambient temperature. The output signal from the amplifier is detected and filtered by a diode detector to provide a direct current signal which is applied to the input transistor of a Schmitt trigger circuit. The input transistor of the Schmitt trigger circuit is normally biased to conduction. When the direct current signal applied to the Schmitt trigger circuit reaches a predetermined value, the normally conducting input transistor is biased to nonconduction causing a rapid switching action to take place, thereby producing an output signal.

The characteristics of a Schmitt trigger circuit having the input transistor normally biased on, is such that the sensitivity of the Schmitt trigger decreases as the temperature of the transistors increases. This means that a signal of greater magnitude is required to initiate the switching action of the Schmitt trigger circuit at higher temperatures. Conversely the gain of the uncompensated amplifier circuit increases as temperature increases. By using transistors, in the amplifier and Schmitt trigger which have substantially the same temperature characteristics, the increase in gain of the amplifier circuit is offset by the decrease in sensitivity of the Schmitt trigger and the magnitude of the alternating current signal which will initiate the switching action of the Schmitt trigger remains relatively constant as the ambient temperature of the circuit changes.

Figure 1:
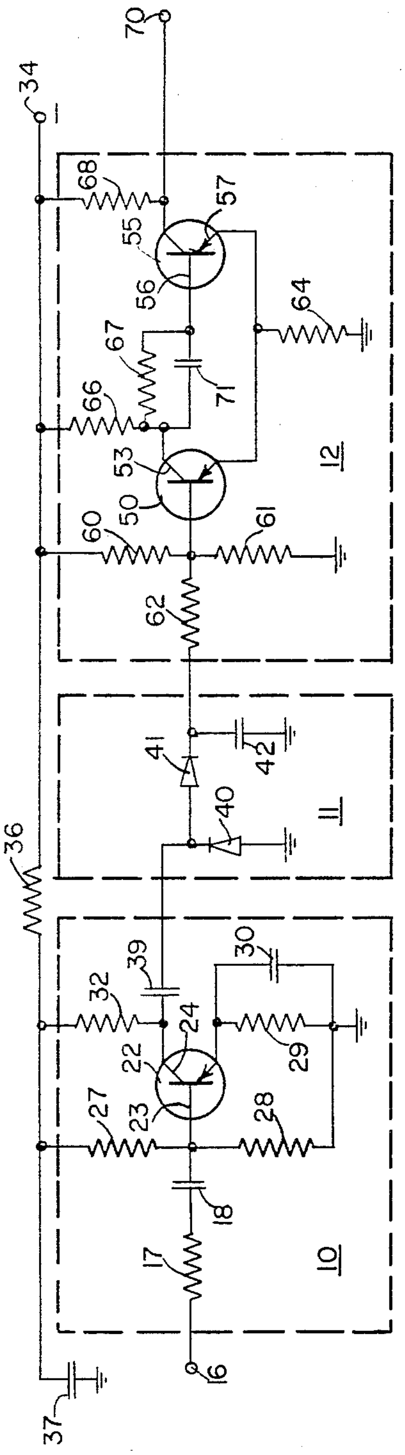
FIG. 1 is a schematic diagram of an alternating current signal detection circuit.

A schematic diagram of the circuit incorportaing the features of this invention is shown in FIG. 1. An alternating current signal, whose magnitude is to be detected, is applied to amplifier 10. The signal is applied to the base 23 of transistor 22 from terminal 16, through resistor 17 and capacitor 18. Resistors 27, 28 and 29 are bias resistors for transistor 22. A bypass capacitor 30 is coupled across resistor 29 to minimize alternating current feedback. Resistor 32, coupled to collector 24, is the load for transistor 22. Resistors 32 and 27 are coupled to the power supply terminal 34 through the decoupling network formed by resistor 36 and capacitor 37.

The output signal from amplifier 10 is coupled to detector circuit 11 through capacitor 39. Detector circuit 11 consists of diodes 40 and 41 and filter capacitor 42. The diodes are poled to develop a positive voltage across capacitor 42, proportional to the amplitude of the alternating current signal output from amplifier 10.

Schmitt trigger 12 includes a pair of transistors 50 and 55. Transistor 50 is normally biased to conduction by bias resistors 60, 61 and 64. The bias voltage developed by resistor 64 and applied to emitter 57 of transistor 55, together with the voltage drop across resistor 66, coupled to collector 53 of transistor 50 and applied to base 56 of transistor 55 through resistor 67, biases transistor 55 to nonconduction. Since no current flows through transistor 55, there is no voltage drop across resistor 68 and the output voltage at terminal 70 is equal to the supply voltage. As the magnitude of the input alternating current signal increases, the positive voltage across capacitor 42 increases. The voltage across capacitor 42 is applied to base 51 of transistor 50. When this voltage reaches a predetermined level, transistor 50 is biased toward nonconduction. As transistor 50 is biased toward nonconduction the voltage at collector 53 drops. This drop in voltage is coupled to base 56 of transistor 55 through resistor 67 and capacitor 71. When the change in voltage across resistor 66 is sufficiently large, transistor 55 begins to conduct. The conduction of transistor 55 causes the current through resistor 64 to increase and thus the bias voltage applied to emitters 52 and 57 to decrease. Transistor 50 is biased further toward nonconduction thus decreasing the current through resistor 66 and the voltage at base 56 of transistor 55. Because of the regenerative action of a Schmitt trigger, once transistor 55 is biased to conduction, a rapid switching action takes place and transistor 50 is biased to nonconduction while transistor 55 is biased to conduction. This rapid switching action is reflected in a rapid change in voltage across resistor 68 which is applied to output terminal 70. Thus Schmitt trigger 12 produces an output pulse when the signal amplitude of the alternating current signal applied to terminal 16 reaches a predetermined level.

Figure 2:
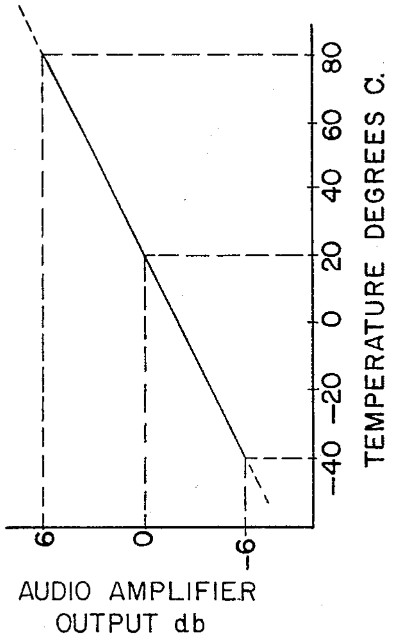
FIG. 2 is a curve showing the change in audio output of the audio amplifier as a function of temperature.

FIG. 2 is a curve showing the change in gain of audio amplifier 10 of FIG. 1 as a functional temperature. As the temperature increases, the gain of amplifier 10 increases, and therefore, for a given input signal the output signal from the amplifier would be larger at higher temperatures.

Figure 3:
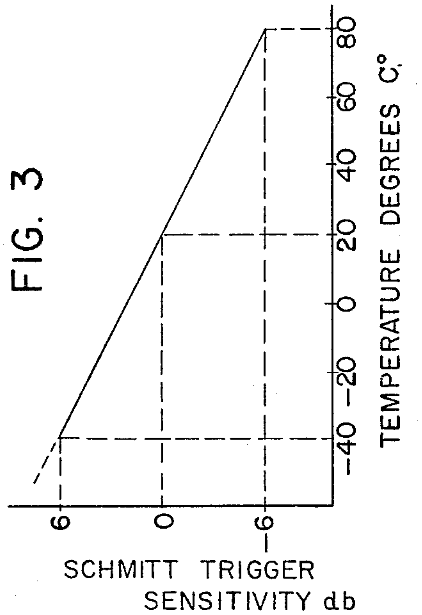
FIG. 3 is a curve showing the sensitivity of a Schmitt trigger circuit as a function of temperature.

FIG. 3 is a curve showing the change of sensitivity of Schmitt trigger 12 as a function of temperature. As the temperature increases, the *Ico* of transistor 50 also increases and provides an increase in the bias current holding transistor 50 in conduction. At higher temperatures a larger signal is required to bias off transistor 50 and thus initiate the switching action of Schmitt trigger 12. Thus the sensitivity of Schmitt trigger 12 decreases with an increase in temperature.

As can be seen from the curves of FIGS. 2 and 3, the increase in signal required to operate Schmitt trigger 12 is provided by the increase in gain of audio amplifier 10 with increasing temperature. Thus an input signal of a given magnitude applied to the audio amplifier will initiate the action of the Schmitt trigger over a wide temperature range without the requirement that each of the circuits involved be specially temperature compensated.

I claim:

1. A detection circuit for producing an output signal when an alternating current input signal reaches a predetermined magnitude, including in combination, an amplifier having an input circuit adapted to receive the alternating current signal, first transistor means for amplifying the signal and an output circuit for the amplified signal, a Schmitt trigger circuit for producing the output signal and including second transistor means, said first and second transistor means having substantially the same temperature characteristics, said second transistor means including an input transistor, bias means coupled to said input transistor for normally biasing the same to conduction whereby the sensitivity of said Schmitt trigger circuit varies inversely as the gain of said amplifier with respect to temperature circuit means including detector means coupling said output circuit of said amplifier to said input transistor, the sensitivity of said Schmitt trigger circuit and the gain of said amplifier being responsive to the ambient temperature whereby changes in said gain are offset by changes in said sensitivity and the magnitude of the alternating current input signal which produces an ouptput signal is relatively independent of the ambient temperature.

2. A detection circuit for producing an output signal when an alternating current input signal reaches a predetermined magnitude, including in combination, an amplifier circuit adapted to receive the alternating current signal and having a first transistor with particular temperature characteristics, a Schmitt trigger circuit for producing the output signal and including second transistor means, said second transistor means including an input transistor having temperature characteristics substantially the same as said first transistor, circuit means including detector means coupling said amplifier to said input transistor, bias means coupled to said input transistor whereby the same is normally biased to conduction, the sensitivity of said Schmitt trigger circuit varying inversely with temperature and the gain of said amplifier circuit varying directly with temperature whereby changes in said gain are offset by changes in said sensitivity and the magnitude of the alternating current input signal which produces an output signal is relatively independent of the ambient temperature.

3. A detection circuit for producing an output signal when an alternating current input signal reaches a predetermined magnitude, including in combination, an amplifier having an input circuit adapted to receive the alternating current signal, a first transistor for amplifying the signal and an output circuit for the amplified signal, first circuit means including second and third transistors connected to form a Schmitt trigger for producing the output signal, said first, second and third transistors having substantially the same temperature characteristics, second circuit means including detector means coupling said output circuit of said amplifier to said second transistor, bias means coupled to said second transistor whereby the same is normally biased to conduction, the sensitivity of said Schmitt trigger circuit varying inversely with temperature and the gain of said amplifier circuit varying directly with temperature whereby changes in said gain are offset by changes in said sensitivity and the magnitude of the alternating current input signal which produces an output signal is independent of the ambient temperature of the detection circuit.

References Cited

UNITED STATES PATENTS 3,067,340 12/1962 Hodges ------------ 307—88.5
3,109,944 11/1963 Seestrom ---------- 307—88.5

JOHN S. HEYMAN, *Primary Examiner.*